United States Patent [19]

Abe

[11] Patent Number: 5,164,036
[45] Date of Patent: Nov. 17, 1992

[54] FILLER-PROVIDED BEAD FORMING APPARATUS

[75] Inventor: Norio Abe, Tokyo, Japan

[73] Assignee: Bridgestone Corporation, Tokyo, Japan

[21] Appl. No.: 605,713

[22] Filed: Oct. 30, 1990

[30] Foreign Application Priority Data

Nov. 22, 1989 [JP] Japan .................. 1-304395

[51] Int. Cl.⁵ .................................... B29D 30/48
[52] U.S. Cl. .............................. 156/422; 156/132; 156/136
[58] Field of Search ............... 156/132, 136, 422

[56] References Cited

U.S. PATENT DOCUMENTS

| | | | |
|---|---|---|---|
| 3,895,986 | 7/1975 | Komatsu et al. | 156/136 |
| 4,209,353 | 6/1980 | Colombane | 156/422 X |
| 4,354,892 | 10/1982 | Tarantola et al. | 156/460 X |
| 4,468,266 | 8/1984 | Cole et al. | 156/398 X |

FOREIGN PATENT DOCUMENTS

| | | |
|---|---|---|
| 0062497 | 10/1982 | European Pat. Off. |
| 2360748 | 6/1975 | Fed. Rep. of Germany |
| 54-88979 | 7/1979 | Japan |
| 56-69148 | 6/1981 | Japan |
| 64-90736 | 4/1989 | Japan |
| 77594 | 9/1977 | Luxembourg |
| 791478 | 3/1958 | United Kingdom |
| 982033 | 2/1965 | United Kingdom |

OTHER PUBLICATIONS

Allen, "Dictionary of Technical Terms for Aerospace Use", 1st Edition, NASA, 1965, p. 292.

Primary Examiner—Michael W. Ball
Assistant Examiner—Francis J. Lorin

[57] ABSTRACT

A filler-provided bead forming apparatus include a cylindrical drum, a transport device for transferring a belt-shaped filler to the proximity of one end of the drum, a pair of grasping units for grasping both ends of the filler arranged on the transport device, respectively, and moving device for moving the grasping units grasping the filler and wrapping the filler around the drum such that the filler is lying on the drum and a bottom end of the filler on a thicker side thereof is in register with the one end of the drum and further for butt joining longitudinal ends of the filler. The apparatus further includes a transfer device for transferring a bead to the one end of the drum, a bladder provided on the drum for raising the filler wound around the drum about the bottom end of the filler on the thicker side thereof upon being expanded to bring the bottom end of the filler into contact with an outer circumference of the bead, and a pressure-joining device for urging the bottom end of the filler against the bead to pressure-join them.

8 Claims, 11 Drawing Sheets

FIG_1
PRIOR ART

FIG_2
PRIOR ART

FIG_3
PRIOR ART

FIG. 5

FIG_7

FIG_8

FIG.10

FIG_11

FIG_12

FIG_13

FILLER-PROVIDED BEAD FORMING APPARATUS

BACKGROUND OF THE INVENTION

This invention relates to an apparatus for forming filler-provided beads for use in tires.

In most prior methods of forming a bead having a filler, the belt-shaped filler is supplied in a raised upstanding state to a bead rotating about its axis. A bottom side of the filler on its thicker edge is then urged against an outer circumference of the rotating bead so that the filler on the thicker edge is wrapped in a circle around the bead. Thereafter, longitudinal ends of the filler are butt joined with each other to form a filler-provided bead.

Figure 1:
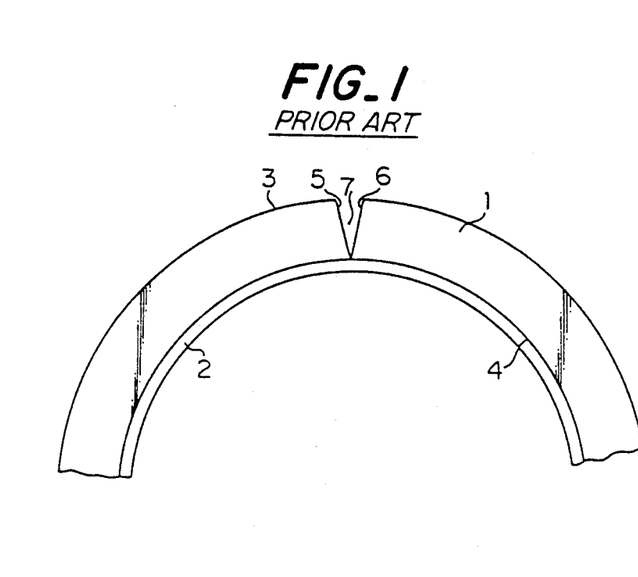
FIG. 1 is a side view illustrating a filler-provided bead of the prior art on the way of forming.
Figure 2:
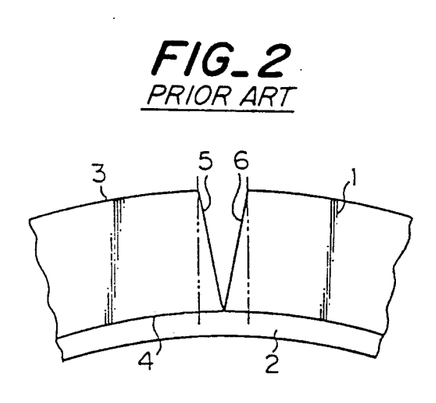
FIG. 2 is a side view illustrating another filler-provided bead of the prior art on the way of forming.
Figure 3:
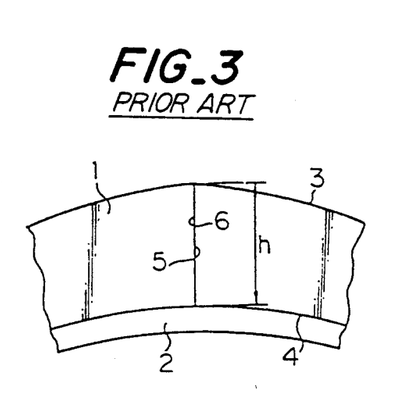
FIG. 3 is a side view illustrating the filler-provided bead shown in FIG. 2 after completion of forming.

In this case, immediately after the filler 1 has been wrapped in a circle around the bead 2, a circle passing through an edge 3 of the filler 1 on a thin side is longer in circumferential length than a circle passing through an edge 4 of the filler 1 on a thick side. A V-shaped clearance 7 therefore occurs between the longitudinal ends 5 and 6 of the filler 1 as shown in FIG. 1. In order to butt joining the longitudinal ends 5 and 6 of the filler 1 under this condition, it is imperative to stretch the ends of the filler 1, increasing stretched lengths as approaching the thin edge 3 of the filler 1 on the thinner side thereof. As a result, the butt joining process can be realized only with difficulty such as uneven joining or insufficient joining strength In order to avoid such a difficulty, it has been proposed that longitudinal ends of a filler 1 are cut as shown in phantom lines in FIG. 2 and cut surfaces are butt joined with each other. With the filler thus joined, however, a radial height h of the filler at the butt joined portion is higher than that of the remaining portion of the filler 1 as shown in FIG. 3. Such an unevenness in height of the filler adversely affects the uniformity of tires to be produced.

SUMMARY OF THE INVENTION

It is an object of the invention to provide an apparatus for forming beads each having a filler, which eliminates all the disadvantages of the prior art and is able to ensure uniform joining at both ends of the filler with high joining strength and uniformity in filler's height, particularly at the joined portion of the filler.

In order to accomplish this object, a filler-provided bead forming apparatus according to the invention comprises a cylindrical drum, transport means for transferring a belt-shaped filler to the proximity of one end of the drum, a pair of grasping units for grasping both ends of the filler arranged on the transport means, respectively, moving means for moving the grasping units grasping the filler and wrapping the filler around the drum in a manner lying on the drum and with a bottom side of the filler on a thicker edge thereof being in register with the one end of the drum and for butt joining longitudinal ends of the filler, transfer means for transferring a bead to the one end of the drum, a bladder provided on the drum for raising the filler wrapped around the drum about the bottom side of the filler on the thicker edge thereof upon being expanded to bring the bottom side of the filler into contact with an outer circumference of the bead, and pressure-joining means for urging the bottom side of the filler against the bead to pressure-join them.

In forming a filler-provided bead, first a belt-shaped filler is transferred to the proximity of one end of the drum by the transport means. Both ends of the filler arranged on the transport means are then grasped by the grasping units. The grasping units grasping the filler are then moved by the moving means so that the filler is wrapped around the drum with a bottom side of the filler being substantially in registration with the one end of the drum in a manner that the filler is lying on the drum. That is, the width direction of the filler is coincident with an axial direction of the drum. Thereafter, the longitudinal ends of the filler are butt joined with each other.

It is noticed in this case that the filler is wrapped around the drum in a manner lying thereon. Immediately before butt joining, therefore, the longitudinal ends (cut ends) of the filler are arranged in parallel with each other so that the butt joining process can be realized without any forced stretching of both the ends of the filler. Consequently, it is possible to ensure uniform butt joining of both the ends of the filler with high joining strength and uniformity in filler's height over the entire circumference of the wrapped filler.

After a bead has been transferred to the one end of the drum by the transfer means, the bladder is expanded to raise the filler about the bottom edge to bring the bottom end into contact with an outer circumference of the bead. Thereafter, the bottom edge of the filler is urged against the bead by the pressure-joining means to form a high quality filler-provided bead.

In wrapping the filler around the drum, it is preferable that the grasping units are moved along involute curves of the drum By moving the grasping units in this fashion, the filler can be uniformly wrapped around the drum without applying any excessive tensile or compressive force.

The invention will be more fully understood by referring to the following detailed specification and claims taken in connection with the appended drawings.

EXPLANATION OF THE PREFERRED EMBODIMENTS

Figure 4:
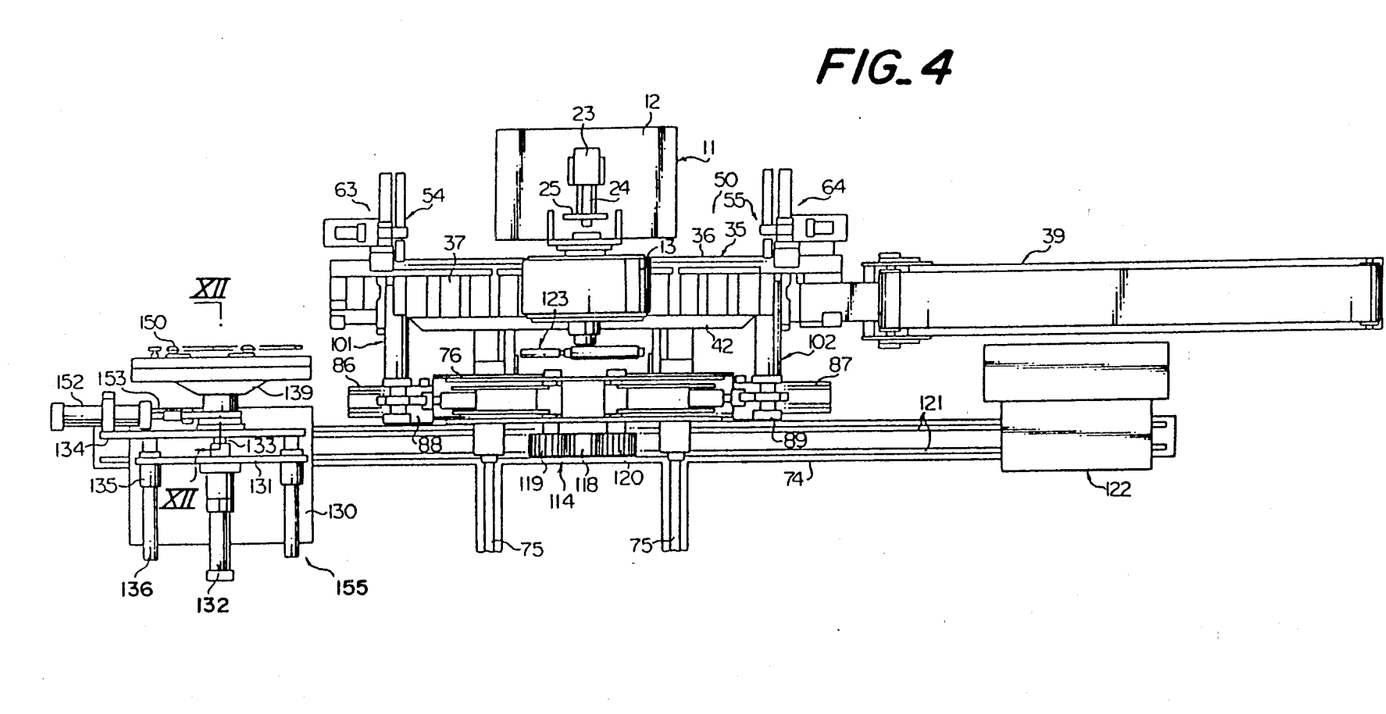
FIG. 4 is a plan view illustrating an entire apparatus of one embodiment according to the invention.
Figure 5:
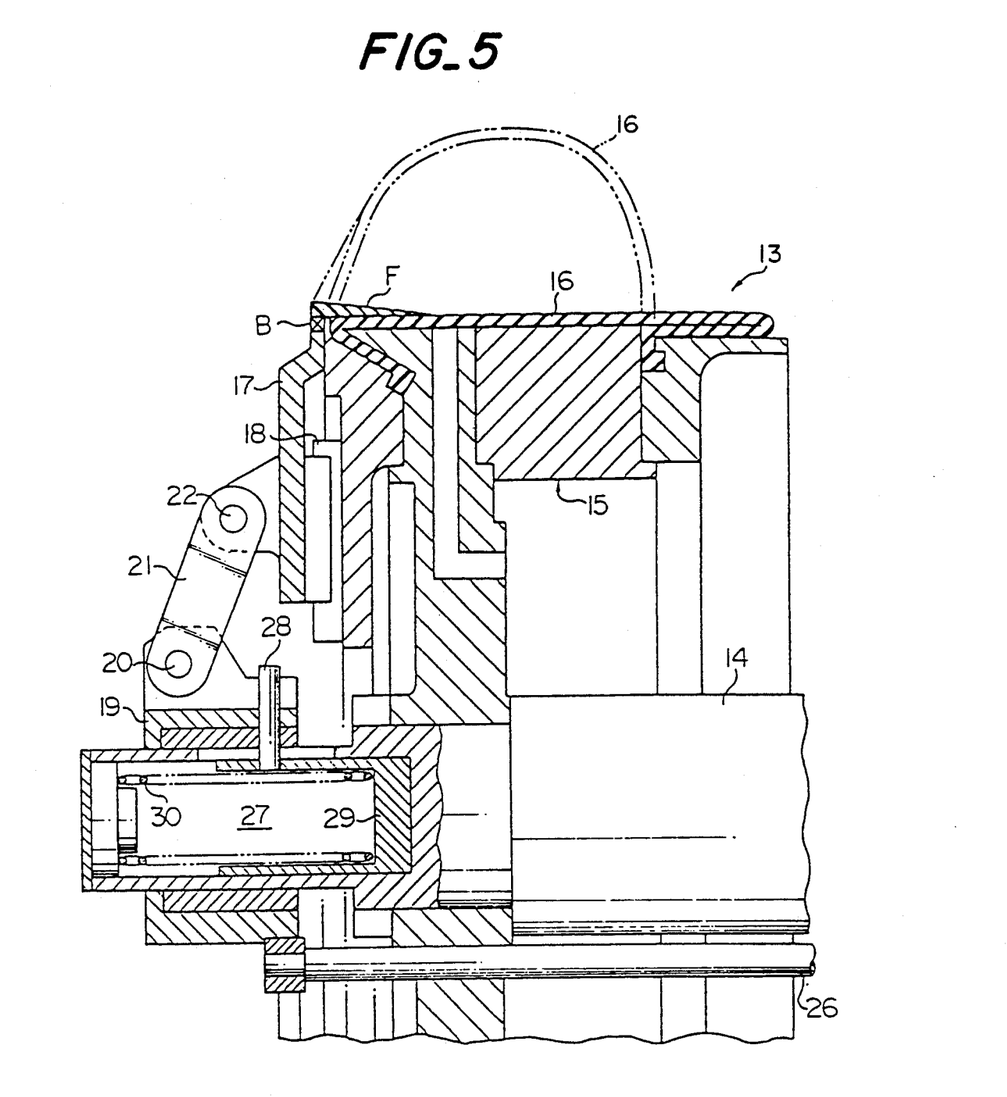
FIG. 5 is a side sectional view of a drum used in the apparatus according to the invention.

Referring to FIGS. 4 and 5, a forming unit 11 comprises a frame 12 and a drum 13 supported on a forward end of the frame 12 and extending in a transverse direction. The "transverse" direction used herein is the direction from an upper to a lower portion or from the lower to the upper portion viewed in FIG. 4 illustrating the apparatus in a plan view. On the other hand, a "longitudinal" direction means a direction perpendicular to the transverse direction. The drum 13 comprises a shaft 14 extending in the transverse direction, a cylindrical drum main body 15 mounted on the shaft 14, and a bladder 16 whose ends are connected to the drum main body 15 in an air-tight manner to expand and contract by supplying and exhausting air into and out of the bladder. A plurality of grasping members 17 are arranged spaced circumferentially substantially equidistant one relative to the other and movable along rails 18 provided radially extending on a front end surface of the drum main body 15.

A slider 19 is movably supported on a front end of the shaft 14. There are provided a plurality of links 21 for connecting the slider 19 and the grasping members 17. One end of each of the links 21 is pivotally connected to the slider 19 by means of a pin 20 and the other end is pivotally connected to each of the grasping members 17 by means of a pin 22. A cylinder 23 extending in the transverse direction is provided on the frame 12 on a rear side of the drum 13. A press-plate 25 is fixed to a rod end of a piston rod 24 of the cylinder 23. A plurality of transmission rods 26 are in parallel with the shaft 14 and slidably inserted in the drum main body. Front ends of the transmission rods 26 are fixed to the slider 19 and rear ends thereof are in opposition to the press-plate 25. As a result, when the piston rod 24 of the cylinder 23 is extended, the transmission rods 26 are moved forwardly by the press-plate 25 so that the grasping members 17 are moved radially inwardly in synchronism with each other.

The shaft 14 is formed at its front end with a spring chamber 27 which accommodates therein a movable spring receiver 29 and a spring 30 urging the spring receiver 29 in a rear direction. A pin 28 secured to the slider 19 is inserted into the spring receiver 29. The spring 30 always urges the slider 19 together with the spring receiver 29 rearward so that the grasping members 17 are always urged radially outwardly. The grasping members 17 move radially outwardly to grasp a bead B on its inside when the bead B is supplied to the drum 13 by means of transfer means 122 later described.

Referring to FIGS. 4, 6, 7 and 8, a conveyor 35 is arranged immediately below the drum 13 and extending in the longitudinal direction. The conveyor 35 comprises a frame 36, a number of rollers 37 rotatably supported by the frame 36 and extending in the transverse direction, and a belt 38 extending around the rollers 37. The belt 38 runs around the rollers 37 by any roller 37 driven by a motor (not shown). A supply conveyor 39 extending in the longitudinal direction is arranged on a right side of the conveyor 35 viewed in FIG. 4. A filler F in the form of belt is supplied onto the conveyor 35 from the supply conveyor 39 as shown by an arrow in FIG. 6 in a manner that the filler extends in a tangential direction to the drum 13.

Figure 6:
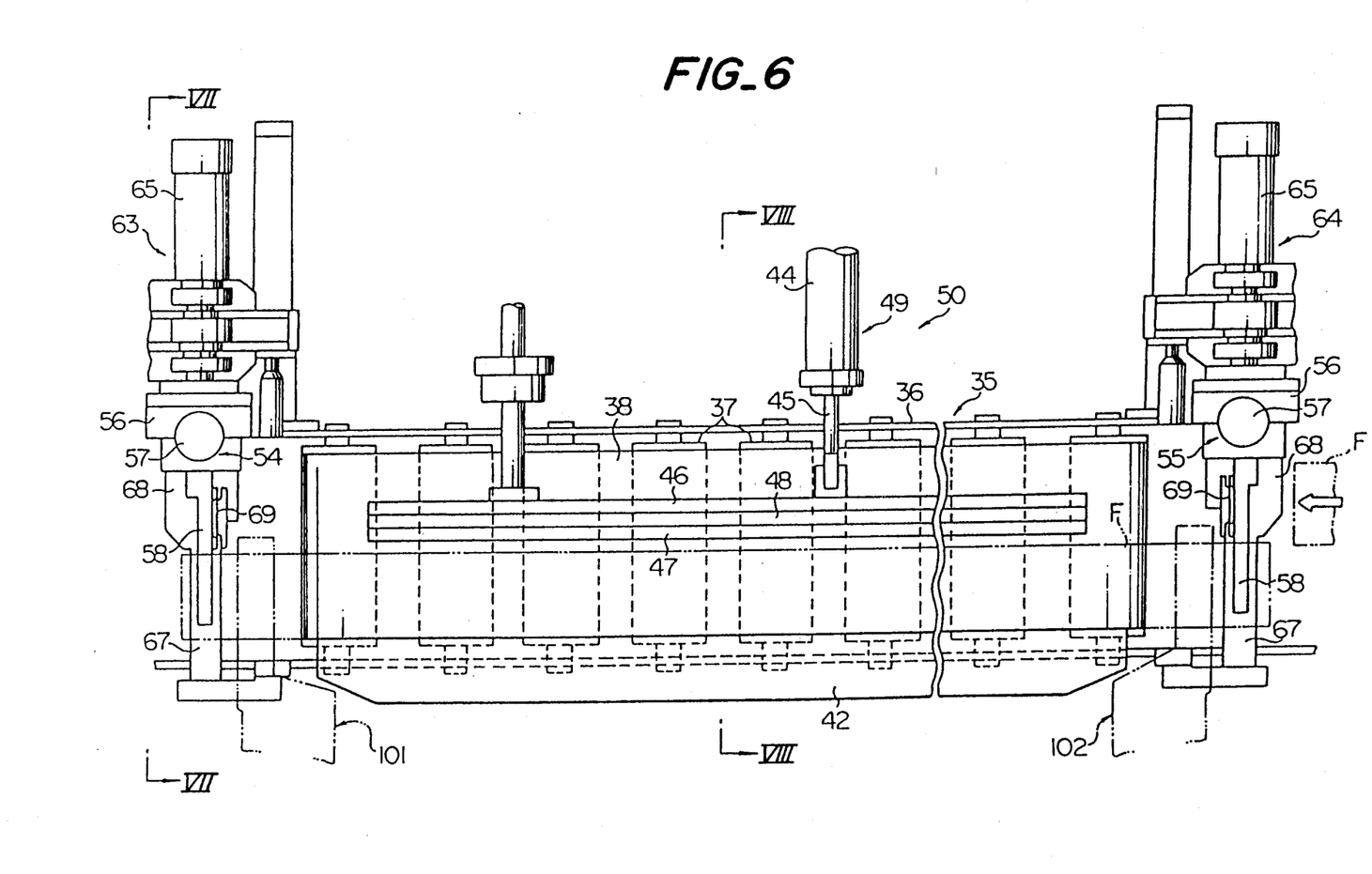
FIG. 6 is a plan view illustrating transport means, a grasping mechanism and a cutting mechanism used in the apparatus according to the invention.

A stopper 42 is provided at a front end of the conveyor 35 and extends along the conveyor 35 substantially over its entire length A cylinder 44 having a piston rod 45 is provided in a manner extending in the transverse direction. To a rod end of the piston rod 45 are fixed a pair of embracing plates 46 and 47 in parallel with the conveyor 35. Between the embracing plates 46 and 47 is embraced a shifting plate 48 in parallel with the stopper 42 and having a length substantially equal to that of the stopper 42. The shifting plate 48 is made of a rubber having a high hardness, whose lower end is adapted to engage an upper surface of the filler F arranged on the conveyor 35.

As a result, when the piston rod 45 of the cylinder 44 is extended, the filler F on the conveyor 35 is forced by the shifting plate 48 to move in a translational movement in the transverse direction on the conveyor 35 until an acute edge F1 of a bottom end of the filler F abuts against the stopper 42. When the acute edge F1 abuts against the stopper 42, an obtuse edge F2 arrives at a location immediately below one end (front end) of the drum 13. The stopper 42, the cylinder 44, the embracing plates 46 and 47, and the shifting plate 48 form as a whole a shifting mechanism 49. The shifting mechanism 49 and the conveyor 35 form as a whole transfer means 50 for transferring the filler F in the form of a belt to the proximity of the one end of the drum 13.

Figure 7:
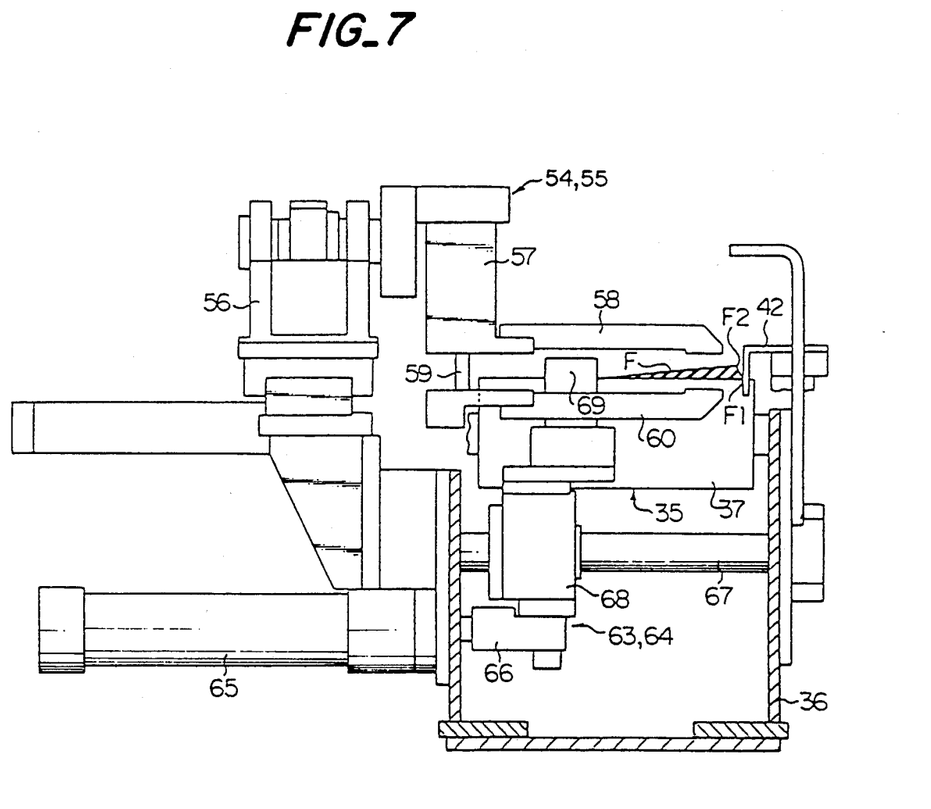
FIG. 7 is an elevation of an embracing mechanism viewed in a direction shown by arrows VII in FIG. 6.
Figure 8:
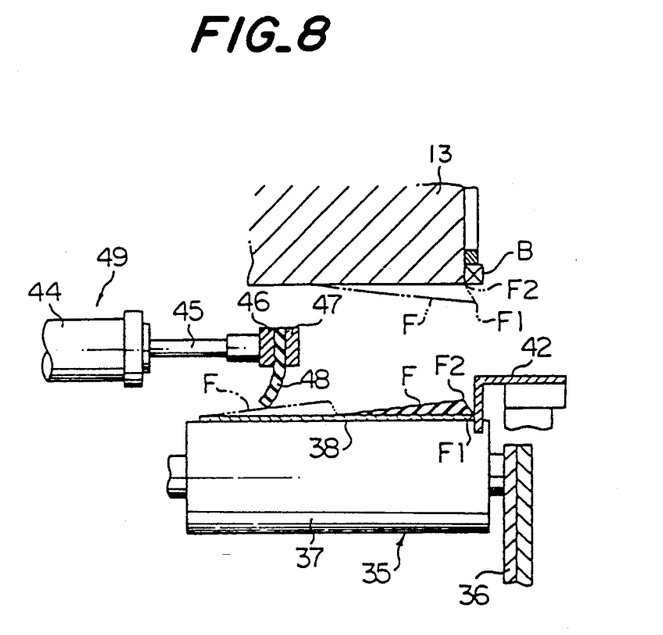
FIG. 8 is a sectional view taken along the line VIII—VIII in FIG. 6.

Referring to FIGS. 4, 6, and 7, the conveyor 35 is provided on both longitudinal ends with embracing mechanisms 54 and 55, respectively, each having a vertical cylinder 57 mounted on the frame 36 through a bracket 56. An upper pawl 58 is secured to each of the cylinders 57, while a lower pawl 60 is secured to a rod end of a piston rod 59 of each of the cylinders 57. When the cylinders 57 of the embracing mechanisms 54 and 55 are actuated to retract the piston rods 59, longitudinal ends of the filler F transferred on the conveyor 35 to a predetermined position are embraced by the upper and lower pawls on upper and lower sides, respectively.

Cutting mechanisms 63 and 64 are arranged in the proximity of the embracing mechanisms 54 and 55, respectively. Each of the cutting mechanisms 63 and 64 comprises a cylinder 65 fixed to the frame 36 and extending in the transverse direction, a guide rod 67 fixed to the frame 36 and extending in the transverse direction, a slide block 68 fixed to a rod end of a piston rod 66 of the cylinder 65 and slidably supported by the guide rod 67, and a cutting blade 69 fixed to the slide block 68 and adapted to be heated to a predetermined temperature by a heater (not shown). When the cylinders 65 are actuated to extend the piston rods 66, the cutter blades 69 of the cutting mechanisms 63 and 64 cut the longitudinal ends of the filler F in its width direction between the embracing mechanisms 54 and 55 and grasping units 101 and 102 described hereinafter.

Referring to FIGS. 4, 9, 10 and 11, in front of the transport means 50 a base 74 is provided on which a pair of rails 75 are arranged extending in the transverse direction. A movable frame 76 is provided on its lower surface with slide bearings 77 secured thereto which slidably engage the rails 75. The movable frame 76 is movable along the rails 75 toward and away from the drum 13 by actuation of a cylinder 73 secured to the base 74 and extending in the transverse direction. A pair of guide plates 78 and 79 are formed on outer peripheries with curved guide surfaces 80 and 81, respectively, and mounted on the movable frame 76. Configurations of the guide surfaces 80 and 81 are formed in parallel with involute curves of the drum 13 having a starting point in the proximity of a vertex of the drum 13.

Figure 9:
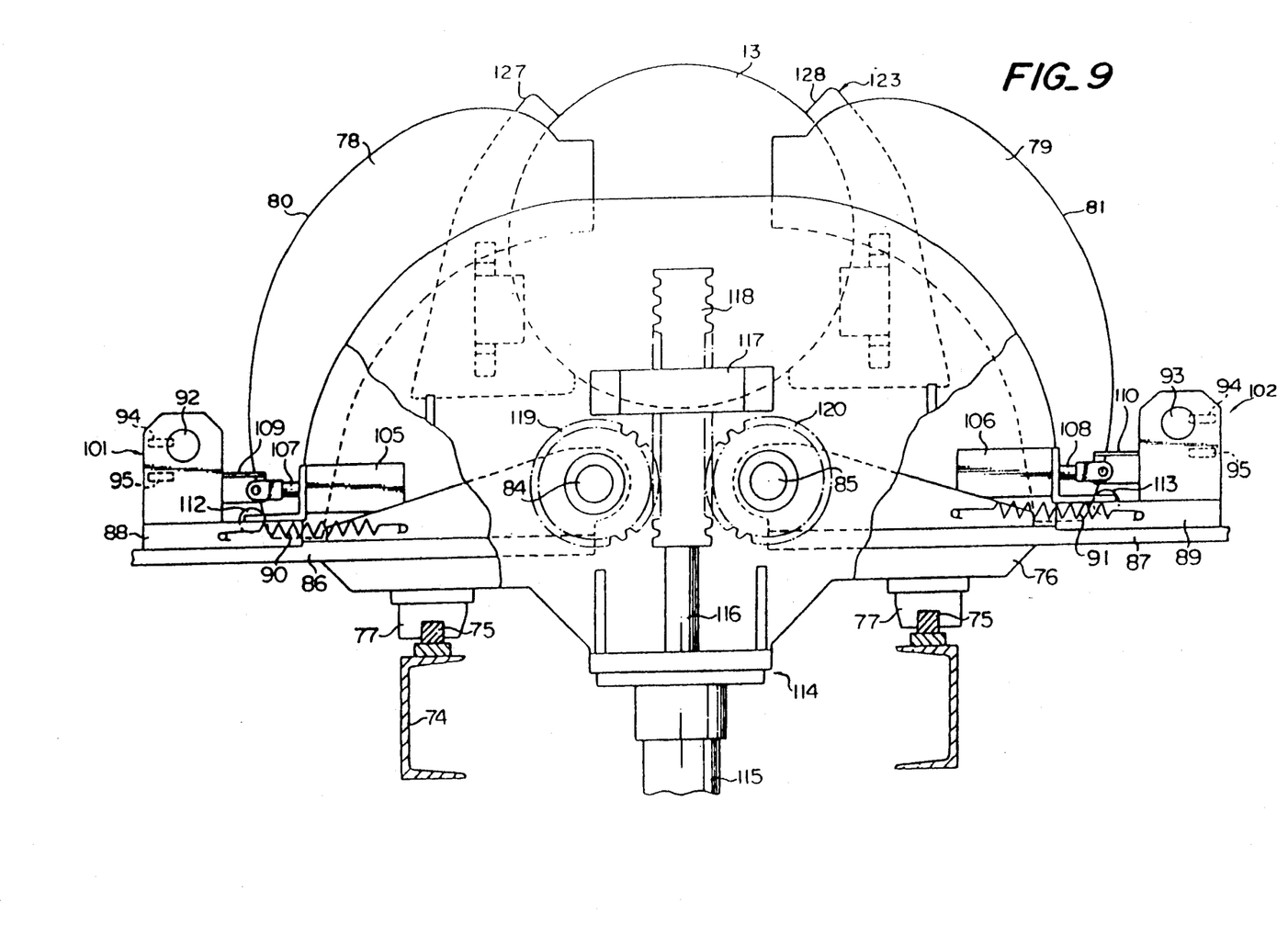
FIG. 9 is a front elevation, partially broken away, of the proximity of moving means used in the apparatus according to the invention.
Figure 10:
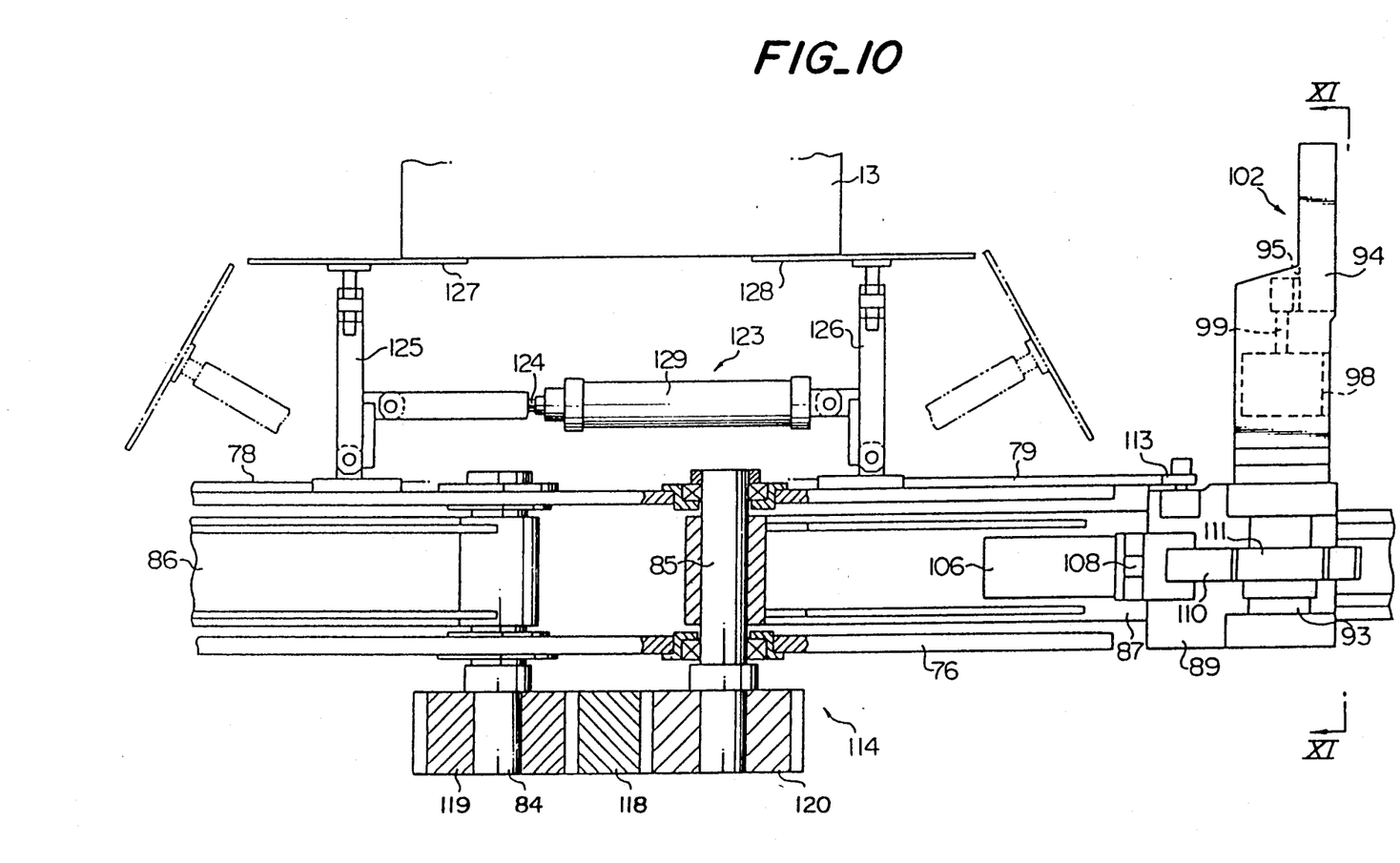
FIG. 10 is a plan view, partially broken away, of the proximity of the moving means.
Figure 11:
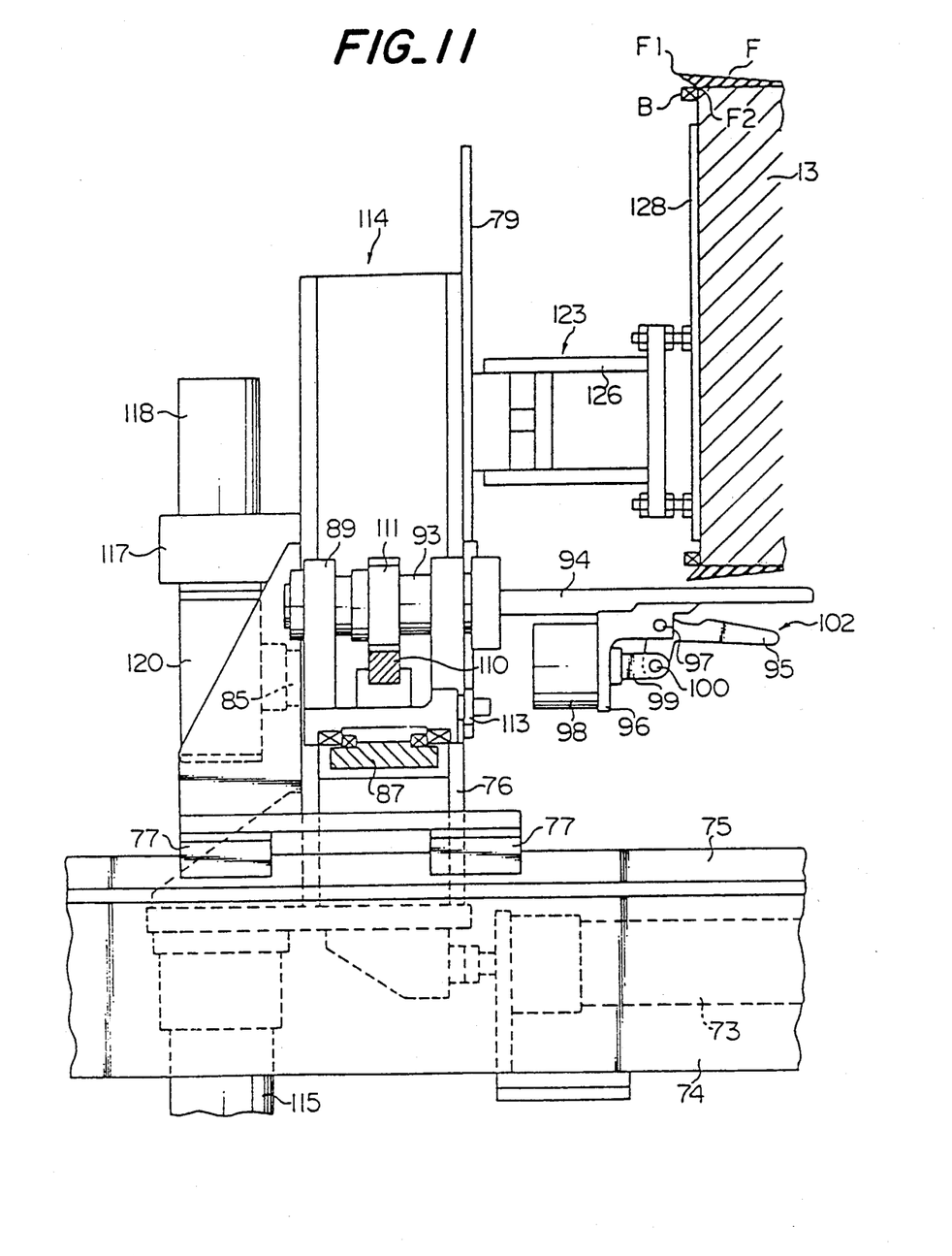
FIG. 11 is a sectional view taken along the line XI—XI in FIG. 10.

A pair of rotary shafts 84 and 85 extending in the transverse direction are rotatably supported by the movable frame 76. Bottom ends of rocking arms 86 and 87 are fixed to the rotary shafts 84 and 85, respectively. Slide members 88 and 89 are supported on ends of the rocking arms 86 and 87, respectively, so that the slide members 88 and 89 are slidable in longitudinal directions of the rocking arms 86 and 87. Tension springs 90 and 91 are provided between the slide members 88 and 89 and the rocking arms 86 and 87 to urge the slide members 88 and 89 toward the rotary shafts 84 and 85, respectively. Rotating shafts 92 and 93 extending in the transverse direction are rotatably supported by the slide members 88 and 89, respectively. A stationary pawl 94 extending in the transverse direction is fixed to each of the rotating shafts 92 and 93.

A movable pawl 95 is formed in an L-shape, whose bent portion is pivotally connected by a pin 97 to a bracket 96 fixed to each of the stationary pawls 94. To each of the brackets 96 is fixed a cylinder 98 having a piston rod 99 whose rod end is connected by a pin 100 to one end of the movable pawl 95.

When these cylinders 98 are actuated to extend the piston rods 99, respectively, the movable pawls 95 are rocked about the pins 97 so that the longitudinal ends of the filler F are grasped by the stationary pawls 94 and the other ends of the movable pawls 95, respectively. The stationary pawls 94, the movable pawls 95, and the cylinders 98 form as a whole a pair of grasping units 101 and 102 for grasping the longitudinal ends of the filler F arranged on the transport means 50, respectively.

Onto the slide members 88 and 89 are mounted a pair of cylinders 105 and 106 whose piston rods 107 and 108 have rod ends to which are connected racks 109 and 110 slidably supported by the slide members 88 and 89, respectively. External gears 111 are mounted on the rotating shafts 92 and 93 to mesh with the racks 109 and 110, respectively. As a result, the cylinders 105 and 106 are actuated to move the racks 109 and 110 in their longitudinal direction, the grasping units 101 and 102 are rotated about the rotating shafts 92 and 93.

Rollers 112 and 113 are rotatably supported on the slide members 88 and 89, respectively. As the slide members 88 and 89 are urged toward the rotary shafts 84 and 85 by the tension springs 90 and 91, the rollers 112 and 113 are urged against and in rolling-contact with the guide surfaces of the guide plates 78 and 79. To the movable frame 76 is fixed a vertically extending cylinder 115 whose piston rod 116 has a rod end to which is connected a rack 118 having teeth on both side and vertically movable guided by a guide 117 fixed to the movable frame 76.

On the rotary shafts 84 and 85 are mounted external gears 119 and 120, respectively, which are in mesh with the teeth on both sides of the rack 118. As a result, when the cylinder 115 is actuated to move the piston rod 116 and the rack 118 vertically, the rocking arms 86 and 87 are rocked about the rotary shafts 84 and 85, respectively. Therefore, the rollers 112 and 113 move rolling on the guide surfaces 80 and 81 so that the grasping units 101 and 102 move along involute curves of the drum circle of the drum 13.

The guide plates 78 and 79, the rotary shafts 84 and 85, the rocking arms 86 and 87, the slide members 88 and 89, the springs 90 and 91, the cylinders 105 and 106, the racks 109 and 110, the external gears 111, the rollers 112 and 113, the cylinder 115, the rack 118, and the external gears 119 and 120 form as a whole moving means 114 for moving the grasping units 101 and 102 grasping the longitudinal ends of the filler F, respectively, along the involute curves of the drum 13. When the moving means 114 is actuated, the filler F is wrapped around the drum 13 in a manner lying on the circumference of the drum and with its bottom edge being substantially in register with one end of the drum. The longitudinal ends of the filler F are thus butt jointed with each other.

To a rear surface of the movable frame 76 are rockably connected bottoms of arms 125 and 126 having rear ends to which are fixed guide plates 127 and 128 adapted to abut against a front end of the drum 13. A cylinder 129 is connected with its head end to the arm 126 and has a piston rod 124 whose rod end is connected to the arm 125. The arms 125 and 126, the guide plates 127 and 128, and the cylinder 129 form as a whole a guide mechanism 123. The guide plates 127 and 128 of the guide mechanism 123 serve to guide the filler F in wrapping it around the drum 13 so that the correct wrapping of the filler F in a predetermined position around the drum 13 is ensured.

Referring again to FIG. 4, a pair of rails 121 are arranged on the base 74 in parallel with the transport means 50 and support thereon transfer means 122. The transfer means 122 is moved from a poised position shown in solid lines in FIG. 4 to a transfer position immediately forward of the drum 13 by means of a cylinder (not shown) for transferring and supplying a bead B to one end of the drum 13.

Figure 12:
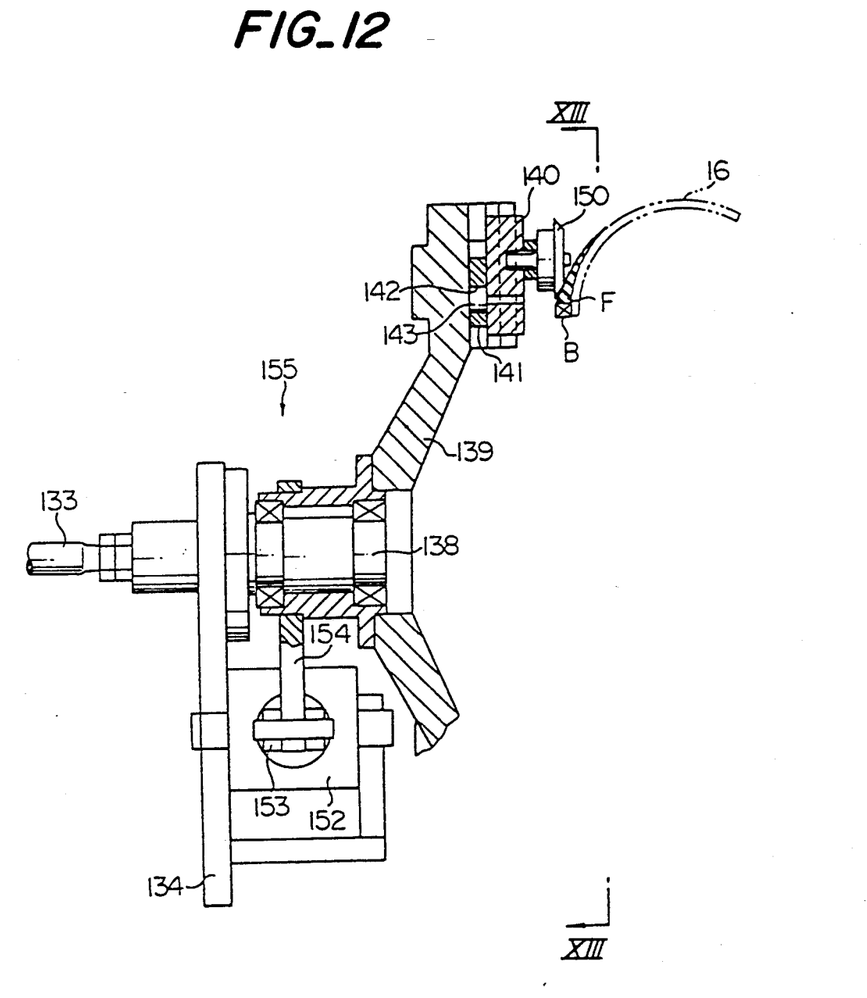
FIG. 12 is a sectional view taken along the line XII—XII in FIG. 4.
Figure 13:
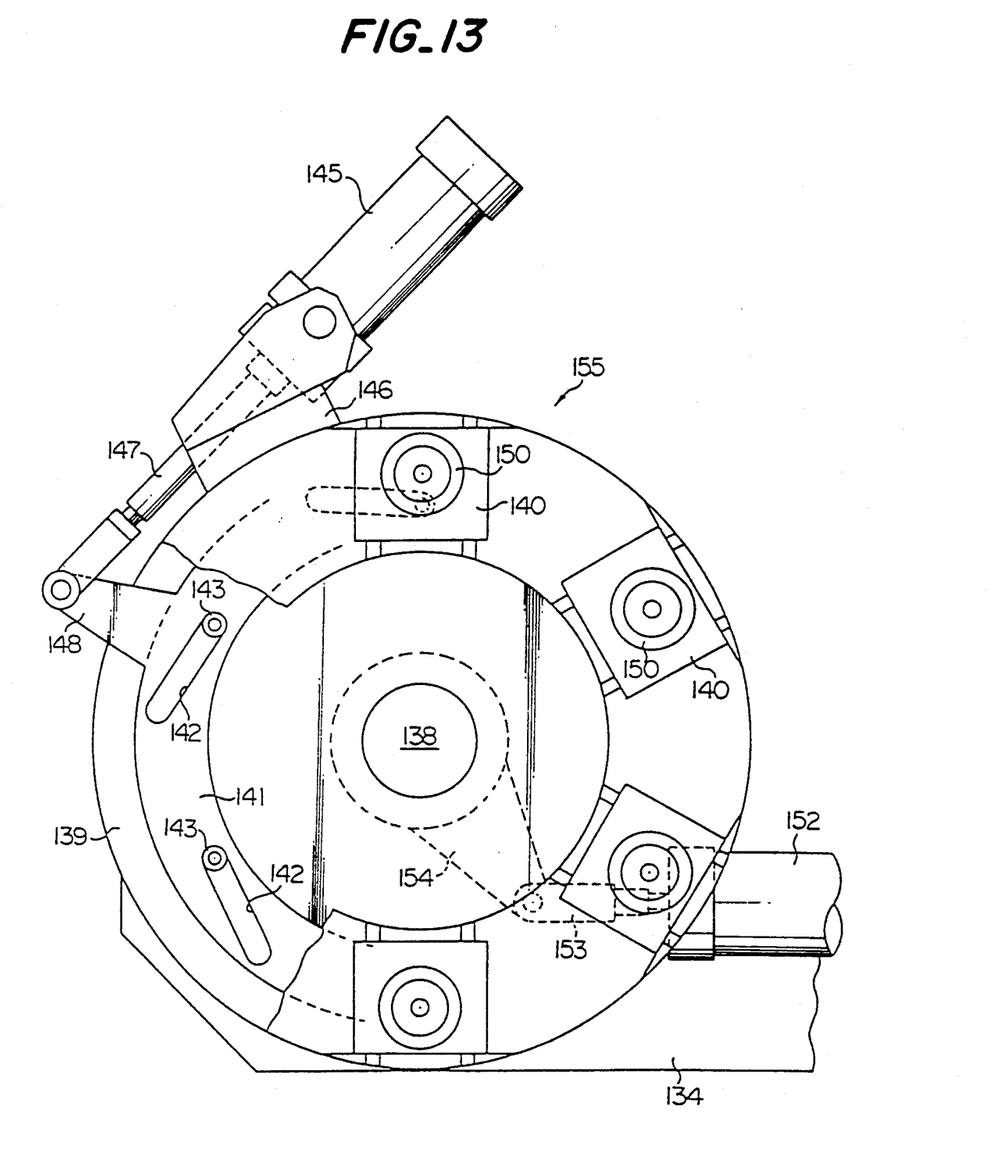
FIG. 13 is an elevation viewed in a direction shown by arrows XIII—XIII in FIG. 12.

Referring to FIGS. 4, 12 and 13, a movable frame 130 is slidably supported on the rails 121 and moved along the rails 121 by means of a cylinder (not shown) between a poised position shown in solid lines in FIG. 4 and a pressure-joining position immediately forward of the drum 13. On the movable frame 130 is upstandingly provided a support plate 131 to which is secured a cylinder 132 extending in the traverse direction. To a rod end of a piston rod 133 of the cylinder 132 is fixed a movable plate 134 in parallel with the support plate 131. To the movable plate 134 is fixed a guide rod 136 inserted in a guide block 135 fixed to the support plate 131.

To a rear surface of the movable plate 134 is fixed a stationary shaft 138 which rotatably supports a rotary disc 139. Movable blocks 140 are radially movably supported on an outer periphery of the rotary disc 139. The movable blocks 140 are plural (six in this embodiment) and spaced circumferentially substantially equidistant one relative to the other.

A rotating ring 141 is formed with a plurality of inclined grooves 142 inclined relative to radial directions and is rotatably supported by the rotary disc 139. Each of the movable blocks 140 rotatably supports a roller 143 which is inserted into each of the inclined grooves 142.

A cylinder 145 is mounted through a bracket 146 on the rotary disc 139 and has a piston rod 147 whose rod end is connected to a protrusion 148 formed on the rotating ring 141. As a result, when the cylinder 145 is actuated to rotate the rotating ring 141, the movable blocks 140 are moved in radial directions in synchronism with each other with the aid of the inclined grooves 142 and rollers 143.

Each of the movable blocks 140 rotatably supports a pressure-joining roller 150 which is adapted to urge the bottom of the filler F against an outer circumference of the bead B to pressure-join the filler F with the bead B. To the movable plate 134 is connected a cylinder 152 whose piston rod 153 having a rod end connected to an arm 154 fixed to the rotary disc 139.

As a result, when the cylinder 152 is actuated, the rotary disc 139 and the pressure-joining rollers 150 are rotated about the stationary shaft 138 through a predetermined angle, 60° in this embodiment. The movable frame 130, the support plate 131, the cylinder 132, the movable plate 134, the stationary shaft 138, the rotary disc 139, the movable blocks 140, the rotating ring 141, the rollers 143, the cylinder 145, the pressure-joining rollers 150, and the cylinder 152 form as a whole pressure-joining means 155 for urging the bottom edge of the filler F against the outer circumference of the bead B to pressure-join the filler F with the bead B.

The operation of the apparatus of the above embodiment will be explained hereinafter.

In forming a bead B having a filler F, first the cylinder 73 is actuated to retract the moving means 114 from the position immediately forward of the drum 13. At this moment, the cylinder 23 is actuated to extend the piston rod 24 so that the transmission rods 26 are moved together with the slider 19 forwardly and hence the grasping members 17 are moved radially inwardly. Under this condition, the transfer means 122 is moved from the poised position shown in solid lines in FIG. 4 to the transfer position immediately forward of the drum 13.

Then, after a bead B held by the transfer means 122 has been supplied to a position on an outer side of one end of the drum 13, the cylinder 23 is actuated to retract the piston rod 24. As a result, the slider 19 is moved rearward by the action of the spring 30 so that the grasping members 17 move radially outwardly to grasp the bead B on its inside. The bead B has been transferred from the transfer means 122 to one end of the drum 13 in this manner.

At this instant, the supply conveyor 39 is actuated to supply a filler F cut substantially in a predetermined length from the supply conveyor 39 onto the conveyor 35 as shown by the arrow in FIG. 6. In this case, the filler F is supplied onto the conveyor 35 with a bottom edge being positioned forward and the thin edge being positioned rearward.

The filler F is then transferred toward the embracing mechanism 54 by the action of the conveyor 35. When a center of the filler F in its longitudinal direction arrives at a location immediately below the drum 13, the conveyor 35 is stopped. At this moment, both longitudinal ends of the filler F have entered between the opened upper and lower pawls 58 and 60 of the embracing mechanisms 54 and 55. At this moment, moreover, the transfer means 122 is returned from the transfer position to the poising position.

Thereafter, the cylinder 73 is actuated to cause the moving means 114 and grasping units 101 and 102 to approach the drum 13. At this time, as the rocking arms 86 and 87 have stopped substantially in horizontal positions, the grasping units 101 and 102 are positioned farthest from the drum 13, and the stationary and movable pawls 94 and 95 of the grasping units 101 and 102 are opened.

The cylinder 44 of the shifting mechanism 49 is then actuated to move the shifting plate 48 forwardly. As a result, the filler F is forced to move forwardly in translational movement in its width direction on the conveyor 35 by the shifting plate 48 until an acute edge F1 of the filler F abuts against the stopper 42. At this time, an obtuse edge F2 of the filler F arrives at the location immediately below the one end of the drum 13, while both the longitudinal ends of the filler F enter between the stationary and movable pawls 94 and 95 of the grasping units 101 and 102.

The cylinders 57 of the embracing mechanisms 54 and 55 are actuated so as to retract their piston rods 59 to embrace portions of the filler F on outer sides of the cutting blades 69 by the upper and lower pawls 58 and 60, while the cylinders 98 of the grasping units 101 and 102 are actuated so as to extend their piston rods 99 to embrace portions of the filler F on inner sides of the cutting blades 69 by the stationary and movable pawls 94 and 95. Thereafter, the cylinder 44 of the shifting mechanism 49 is actuated so as to retract the piston rod 45 to return the shifting plate 48 to its initial position.

The cylinders 65 of the cutting mechanisms 63 and 64 are then actuated so as to extend their piston rods 66 to cut the filler F along the width direction between the embracing mechanism 54 and the grasping unit 101 and between the embracing mechanism 55 and the grasping unit 102 by means of the cutting blades 69. Thereafter, the cylinders 65 are actuated to return the cutting blades 69 to their initial positions.

The cylinder 115 of the moving means 114 is then actuated so as to retract its piston rod 116 to lower the rack 118. As a result, the rocking arms 86 and 87 are rocked upwardly about the rotary shafts 84 and 85. At this time, the rollers 112 and 113 of the slide members 88 and 89 are urged against the guide surfaces 80 and 81 of the guide plates 78 and 79 by means of the springs 90 and 91. Consequently, the rollers 112 and 113, the slide members 88 and 89, and the grasping units 101 and 102 grasping the longitudinal ends of the filler F are moved guided by the guide surfaces 80 and 81 toward the top of the drum 13.

As a result, first the filler F is raised until its longitudinal center comes in contact with a lower outer periphery of the drum 13, and then the filler F is wrapped around the drum 13 progressively from the longitudinal center to both the ends of the filler F. It should be noticed that the guide surfaces 80 and 81 are formed in parallel with the involute curves of half circles of the drum 13 as above described. Therefore, the grasping units 101 and 102 are moved along the involute curves of the drum 13. As a result, the filler F is wrapped around the drum 13 uniformly without being subjected to any excessive tensile or compressive force.

It should be again noticed that the filler F has been arranged on the conveyor 35 with the obtuse edge F2 being in registration with the one end of the drum 13. Accordingly, the filler F is wrapped around the drum 13 with the obtuse edge F2 or the bottom of the filler F on the thicker side being exactly in registration with the one end of the drum 13. In this case, the guide plates 127 and 128 of the guide mechanism 123 abut against the one end surface of the drum 13 to guide the filler F in order to ensure the exact wrapping of the filler F around the drum 13.

Moreover, the filler F has been arranged lying on the conveyor 35. Consequently, the filler F is wrapped around the drum 13 in a manner lying thereon, that is to say, with the width direction of the filler F being coincident with the axial direction of the drum 13. It is of course that in wrapping the filler F, the cylinders 57 of the embracing mechanisms 54 and 55 are actuated so as to open the upper and lower pawls 58 and 60 to remove cut waste portions of the filler F.

The greater part of the filler F has been wrapped around the drum 13, once the operation of the cylinder 115 is stopped. At this time, both the longitudinal ends of the filler F grasped by the grasping units 101 and 102 extend substantially vertically, and both end surfaces (cut surfaces) of the longitudinal ends face upwardly. Therefore, the cylinders 105 and 106 are actuated so as to extend their piston rods 107 and 108 to move the racks 109 and 110. As a result, the grasping units 101 and 102 grasping the longitudinal ends of the filler F are rotated about the rotating shafts 92 and 93 through about 90° so that both the end surfaces (cut surfaces) of the filler F are brought into opposition to each other.

Under this condition, the cylinder 115 is again actuated to retract the piston rod 116 further so that both the longitudinal ends of the filler F grasped by the grasping units 101 and 102 move closer together and contact with each other. After contacting both the ends, the cylinder 115 is still actuated to cause the grasping units 101 and 102 to move toward each other, with the result that both the end surfaces of the filler F are forced to be butt joined with each other.

In this case, as the filler F has been wrapped in the lying condition around the drum 13 as above described, both the longitudinal end surfaces (cut surfaces) are arranged in parallel with each other immediately before the butt joining of them. As a result, the butt joining can be carried out without any forced stretching of both the ends of the filler F. Therefore, it is possible to ensure a uniform butt joining of the ends of the filler F with a high butt joining strength and with a uniform height of the filler on the drum 13. Inasmuch as such a filler is raised and pressure-joined with a bead as later described, a bead B having the filler F in high quality can be obtained.

The cylinders 98 of the grasping units 101 and 102 are then actuated so as to retract their piston rods 99 to rotate the movable pawls 95. As a result, the grasping units 101 and 102 are opened to release the filler F. The cylinders 73 are then actuated to move the moving means 114 forwardly so that the grasping units 101 and 102 move away from the filler F.

Thereafter, the pressure-joining means 155 is then moved from the poised position shown in solid lines in FIG. 4 to the pressure-joining position immediately forward of the drum 13. The cylinder 132 of the pressure-joining means 155 is then actuated so as to extend the piston rod 133 so that the pressure-joining rollers 150 are moved to positions on a radially outer side of the bead B. Thereafter, the bladder 16 of the drum 13 is supplied with pressurized air so as to be expanded as shown in phantom lines in FIG. 5. Therefore, the filler F wrapped around on the outside of the one end of the drum 13 is raised about the bottom of the filler F on the thicker side or the obtuse edge F2 of the filler F so that the surface of the bottom of the filler F and an outer circumferential surface of the bead B are brought into contact with each other (FIG. 12).

Thereafter as illustrated in FIG. 13, the cylinder 145 of the pressure-joining means 155 is actuated so as to extend the piston rod 147 to rotate the rotating ring 141. As a result, the movable blocks 140 are radially inwardly in synchronism with each other with the aid of the inclined grooves 142 and the rollers 143, so that the pressure-joining rollers 150 force the bottom of the filler F on the thicker side against the outer circumference of the bead B. Under this condition, the cylinder 152 of the pressure-joining means 155 is actuated to cause the piston rod 153 to perform, for example, two reciprocative movements. As a result, the six pressure-joining rollers 150 roll on the filler F through 60°, urging the bottom of the filler F against the outer circumference of the bead B so that the bottom surface of the filler F is uniformly pressure-joined with the outer circumference of the bead B.

The cylinder 145 is then actuated to retract the piston rod 147 so that the movable blocks 140 and the pressure-joining rollers 150 are moved radially outwardly to disengage the pressure-joining rollers 150 from the filler F. The cylinder 132 is then actuated to retract the piston rod 133 so that the pressure-joining rollers 150 are retracted from the drum 13 and the pressurized air is exhausted from the bladder 16 which would thus contracts.

Thereafter, the pressure-joining means 155 is returned to the poised position. The cylinder 23 is then actuated to extend the piston rod 24 so that the grasping members 17 are moved radially inwardly in synchronism with each other to release the bead B from the grasping by the grasping members 17. At the same time, the formed bead B with the filler F is removed by means of taking-out means (not shown). When the filler F is pressure-joined with the bead B as above described, the cylinders 105, 106 and 115 are actuated to return the rocking arms 86 and 87 and the grasping units 101 and 102.

This is one cycle of the operation of the apparatus of the embodiment according to the invention. Thereafter, this cycle is repeatedly carried out to produce beads B with fillers F successively.

While the filler F is raised by moving the grasping units 101 and 102 and brought into contact with the drum 13 in the above embodiment, it will be apparent that the drum 13 may be lowered to bring the filler F into contact with the drum 13 in this invention.

As can be seen from the above description, the apparatus according to the invention can produce beads each having a filler whose joined portion at both ends of the filler is uniformly joined with high joining strength and whose height is uniform, particularly at joined portion.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A filler-provided bead forming apparatus comprising; a cylindrical drum, transport means for transferring a belt-shaped filler to the proximity of one end of the drum, the filler including two longitudinal opposed end portions, a thin edge portion widthwise of the filler and a thick edge portion having an obtuse edge portion, an acute edge portion, and a bottom side portion between the obtuse and acute edge portions, a pair of grasping units arranged on the transport means for grasping the longitudinal opposed end portions of the filler, respectively, with the end portions aligned horizontally with respect to the surface of the conveyor belt, moving means for moving the grasping units grasping the opposed end portions of the filler, respectively, along a pair of curved guide surfaces each formed by involute curves of the drum, respectively, and wrapping the filler around the drum with the thick edge portion of the filler being in register with the one end of the drum in such a manner that the filler is wrapped around the drum progressively from the longitudinal center to the opposed end portions of the filler, transfer means for transferring a bead to the one end of the drum, a bladder provided on the drum for raising the filler wrapped around the drum about the bottom end of the filler on the thicker side thereof upon being expanded to bring the bottom end of the filler into contact with an outer circumference of the bead, and pressure-joining means for urging the bottom side portion of the filler against the bead to pressure-join them.

2. The filler-provided bead forming apparatus as set forth in claim 1, wherein said transport means comprises a conveyor for transferring the filler to the drum, and shifting means for shifting the filler on the conveyor to a position where the obtuse edge of the thicker edge portion of the filler is immediately below the one end of the drum.

3. The filler-provided bead forming apparatus as set forth in claim 2, wherein said shifting means comprises a cylinder extending in a direction substantially perpendicular to an extending direction of the conveyor, embracing means mounted on a rod end of a piston rod of the cylinder, shifting plate held by the embracing means for shifting the filler to said position where the obtuse edge of the filler is immediately below the one end of the drum, and a stopper for determining the position of the obtuse edge of the filler.

4. The filler-provided bead forming apparatus as set forth in claim 1, wherein each of said pair of grasping units comprises a stationary pawl, a cylinder mounted through a bracket, and a movable pawl in the form of L-shape whose one end is pivotally connected to a rod end of a piston rod of the cylinder and whose bent portion is pivotally connected on the bracket.

5. The filler-provided bead forming apparatus as set forth in claim 1, wherein said moving means comprises guide plate means for moving the grasping units along the involute curves of the, respectively.

6. The filler-provided bead forming apparatus as set forth in claim 1, wherein said moving means comprises a pair of guide plates each having an outer periphery, the curved guide surface formed by parallel translation of involute curves produced by rolling the drum, rotary shafts having external gears, respectively, a rack having on both sides teeth in mesh with the external gears, respectively, a cylinder for driving said rack to rotate the external gears and the rotary shafts, rocking arms whose bottom ends are fixed to the rotary shafts, respectively, slide members supported on the rocking arms slidably in longitudinal direction of the rocking arms, respectively, spring means for urging the slide members toward the rotary shafts, respectively, a pair of cylinders mounted on the slide members, respectively, racks supported on piston rods of said pair of cylinders and slidable in the slide members, respectively, external gears in mesh with the racks supported on the piston rods of the pair of cylinders and fixed to shafts of the grasping units, respectively, so that when the pair of the cylinders are actuated to rotate the external gears fixed to the shafts of the grasping units, the grasping units are rotated, and rollers rotatably supported by the slide members and in rolling-contact with the curved guide surfaces of the guide plates, respectively.

7. The filler-provided bead forming apparatus as set forth in claim 6, wherein said moving means comprises guide means for guiding the filler when it is wrapped around the drum, said guide means comprises arms whose one ends are rockably connected to a movable frame to which said guide plates are connected, respectively, guide plates fixed to the other ends of the arms, respectively, and able to abut against an end surface of the drum, and a cylinder whose head end is connected to one of the arms of the guide means and whose piston rod has a rod end connected to the other arm.

8. The filler-provided bead forming apparatus as set forth in claim 1, wherein said pressure-joining means comprises driving means for moving the pressure-joining means toward and away from the filler wrapped around the drum, a rotary disc rotatable about a stationary shaft, movable blocks radially movably supported on the rotary disc and spaced circumferentially substantially equidistant one relative to the other, a rotary ring formed with a plurality of inclined grooves inclined relative to radial directions and rotatably supported by the rotary disc, rollers rotatably supported by the movable blocks and inserted into the inclined grooves of the rotary ring, respectively, a cylinder connected to the rotary ring for moving the movable blocks in radially directions with the aid of the inclined grooves and the rollers inserted therein when the cylinder is actuated, pressure-joining rollers rotatably supported by the movable blocks, respectively, and a cylinder for rotating the rotary disc and the movable blocks about the stationary shaft.

* * * * *